(12) United States Patent
Takaoka

(10) Patent No.: US 6,252,674 B1
(45) Date of Patent: *Jun. 26, 2001

(54) HOST DEVICE AND PICTURE IMAGE OUTPUT DEVICE

(75) Inventor: Satoshi Takaoka, Ebina (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,504

(22) Filed: Oct. 29, 1997

(30) Foreign Application Priority Data

Nov. 1, 1996 (JP) .................................... 8-291362

(51) Int. Cl.$^7$ ........................................ G06F 3/12
(52) U.S. Cl. ............................................... 358/1.5
(58) Field of Search ..................... 358/400, 402, 358/442, 440, 468, 444; 379/100.01, 100.05; 455/115

(56) References Cited

U.S. PATENT DOCUMENTS

| | | | |
|---|---|---|---|
| 4,994,926 | * 2/1991 | Gordon | 358/400 |
| 5,490,287 | * 2/1996 | Itoh | 455/66 |
| 5,757,510 | * 5/1998 | Okada | 358/440 |

FOREIGN PATENT DOCUMENTS

| | | | | |
|---|---|---|---|---|
| 000656581 | * | 6/1995 | (EP) | ................ G06F/3/12 |
| 4-264945 | | 9/1992 | (JP) . | |
| 4-276819 | | 10/1992 | (JP) . | |
| 5-19986 | | 1/1993 | (JP) . | |
| 5-73233 | | 3/1993 | (JP) . | |
| 5-227341 | | 5/1993 | (JP) . | |
| 407200215 | * | 8/1995 | (JP) | ................ G06F/3/12 |
| 7295766 | * | 11/1995 | (JP) | ................ G06F/3/12 |
| 7-325685 | | 12/1995 | (JP) . | |

* cited by examiner

Primary Examiner—Jerome Grant, II
(74) Attorney, Agent, or Firm—Oliff & Berridge, PLC

(57) ABSTRACT

Picture image output processing is performed that takes into consideration the time elapsed from when picture image output demands are made by a user to when the output results are acquired. A host device or information processing device includes a position information memory that stores information based on the respective positional relationships of the host device main body and multiple picture image output devices. A picture image output device selector determines which picture image output device the picture image information is transmitted to using the information based on these positional relationships. The picture image output device also includes position information memory that stores information based on the respective positional relationships of the picture image output device main body and multiple host devices. A picture image output priority determiner determines from which host device the picture image information is received using the information based on these positional relationships.

5 Claims, 10 Drawing Sheets

FIGURE EXPLAINING CONNECTING SHAPE OF FIRST EMBODIMENT

FIGURE EXPLAINING CONNECTING SHAPE OF SECOND EMBODIMENT

PROCESS FLOWCHART OF FIRST EMBODIMENT (PART 1)

FIGURE EXPLAINING LAYOUT EXAMPLE

HOST DEVICE AND PICTURE IMAGE OUTPUT DEVICE

BACKGROUND OF THE INVENTION

1. Field of Invention

The present invention relates to picture image output devices that are arranged in prescribed positions throughout a network and perform the reception of picture image information, and host devices that perform the transmission of the picture information.

2. Description of Related Art

In recent years, information related tools such as personal computers and the like, have been used more and more frequently connected by means of networks. The picture image output devices are also connected in networks wherein multiple picture image output devices are connected in common with multiple host devices (e.g. information related tools such as personal computers). One host device or multiple host devices may be used to select the desired picture image output device.

Under these circumstances, it becomes important to determine how the picture image output demands are processed to a particular picture image output device from multiple host devices. For example, in Japanese patent publication 4-264945, a means is shown for processing the picture image output in accordance with high priority output demands. In Japanese patent publication 4-276819, the technology is shown that makes it possible to change the priority of the picture image output demands after they have been initially determined.

Also, in Japanese patent publications 5-19986, and 5-73233, the technology is shown for cases where there are high priority picture image output demands after processing has begun, thus requiring interruption of the present processing for the high priority picture image processing. Furthermore, in Japanese patent publication 7-325685, technology is shown that considers the picture image output waiting time in addition to the above-mentioned priorities.

Ordinarily, the picture image output demands are transmitted from one host device, with the selection of a picture output device connected to the network being entrusted to the user of the host device. Alternatively, Japanese patent publication 5-227431 shows a host device that automatically selects suitable picture image output devices according to the conditions of each picture image output device.

As shown in the above-discussed related art, conventional picture image output operations often include the three steps of: 1) picture image output by the user; 2) picture image output by the picture image output device; and 3) acquisition of the output results by the user.

In the above-discussed related art, improvements are noticed at steps (1) and (2). However, the conventional methods do not take into consideration improving the acquisition of the output results by the user.

In other words, after the user sends out the picture image output demands from the host device, and the output demands move on to the corresponding picture image output device, a recording medium printed on by the picture image output device is received. The host devices and picture image output devices of the prior art do not take into consideration the length of the distances between them, or the time required for successful output in accordance with an output demand at a particular output device. As a result of the failure of the prior art devices to take into consideration these sort of positional relationships, the most efficient use of time and printing resources during a series of operations performed by the users is not attained.

SUMMARY OF THE INVENTION

The present invention includes at least one host device and picture image output devices that are controlled and configured to resolve the above-discussed problems with conventional systems. A host device of the present invention is a device that transmits the picture image information to one of multiple picture image output devices that are arranged in prescribed positions throughout a network. The host device includes a storage means or recording means that stores information on the respective positional relationships of a device main body and multiple picture image output devices. A picture image output device selection means is provided for using the information on the positional relationships stored in the storage means and determining if the picture image information was transmitted to one of the picture image output devices.

The picture image output device of the present invention also receives the picture image information from one of a plurality of host devices that are arranged in prescribed positions throughout the network. A storage means or recording means in the output device stores information on the respective positional relationships of the device main body and the multiple host devices. A picture image output priority determination means uses the information on the positional relationships that were stored in the storage means and determines if the picture image information was received from one of the host devices.

Information based on the respective positional relationships of the host device main bodies and multiple picture image output devices is stored in the storage means by the host devices of the present invention. The information based on these positional relationships is used by the picture image output device selection means, and the selection means determines which picture image output device among the multiple picture image output devices would enable the most efficient use of time and printing resources as a result of being physically or temporally closest to the host device main body. Subsequently, the picture image information is transmitted to the selected picture image output device.

A picture image output device according to an embodiment of the present invention also utilizes the stored information on the respective positional relationships of the picture image output device main body and multiple host devices. The information based on these positional relationships is used with the picture image output priority determination means, and there is a determination of which host device among the multiple host devices is physically and temporally closest to the picture image output device main body. Accordingly, the output demands from this host device are prioritized, and picture image output processing is performed.

In accordance with the above-described features of the present invention, the host devices and picture image output devices are arranged in prescribed positions throughout the network, and the printing of picture image information in accordance with a user's output demands is achieved in the most efficient manner possible. The picture image output information is transmitted to the physically or temporally closest picture image output device from a particular host device, or in the case when there are picture image output demands from multiple host devices, the picture image information that was transmitted from the physically or temporally closest host device from a particular picture image output device is prioritized and output.

BRIEF DESCRIPTION OF THE DRAWINGS

The invention will be described in conjunction with the following drawings in which like features are designated with like reference characters, and in which.

DETAILED DESCRIPTION OF PREFERRED EMBODIMENTS

Figure 1:
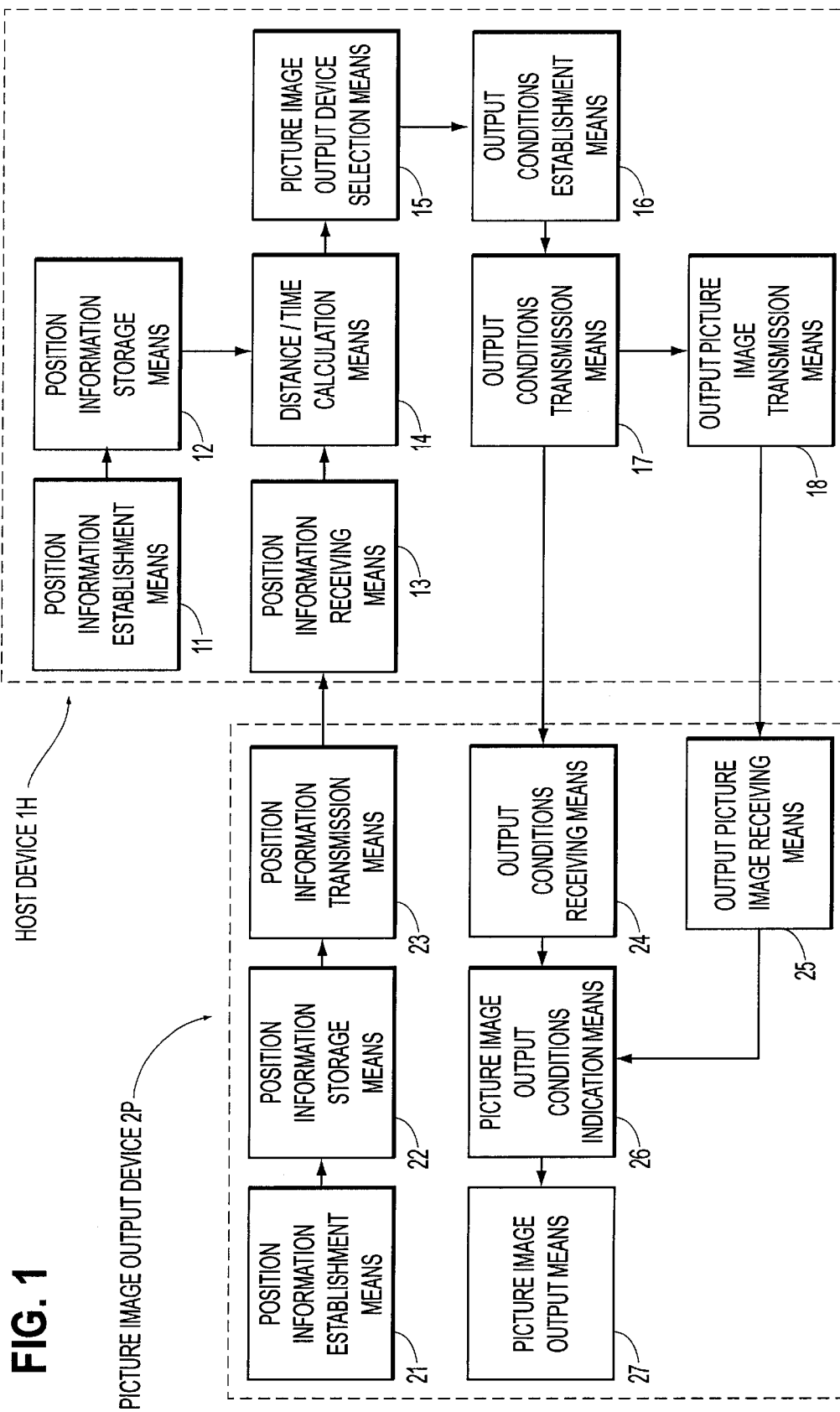
FIG. 1 is a block diagram showing a first embodiment.
Figure 2:
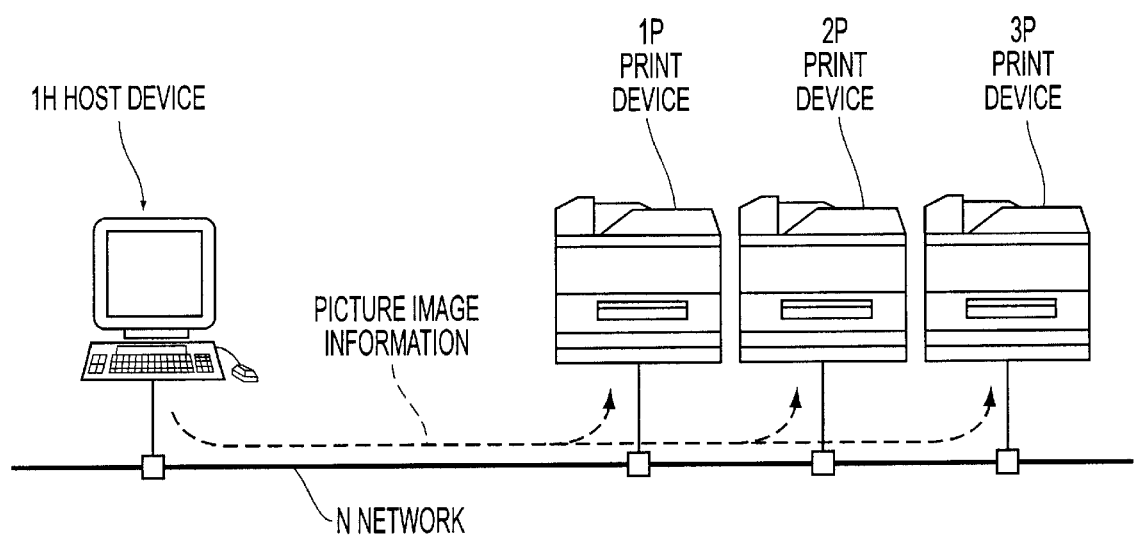
FIG. 2 is a schematic drawing showing the interconnection of components in the first embodiment.

The present invention is explained hereafter with reference to the figures. FIG. 1 is a block diagram that shows a first embodiment, and FIG. 2 shows the interconnections of components in the first embodiment. In the first embodiment, one of the multiple picture image output devices 1P, 2P or 3P is selected through a network N from a host device 1H. Picture image information is transmitted from the host device 1H to any one of the picture image devices 1P, 2P or 3P.

As illustrated in FIG. 1, the host device 1H of the present embodiment includes position information establishment means 11 that establishes the position information of the host device main body, position information storage or recording means 12 that stores this position information, position information receiving means 13 that receives the position information of a picture image output device 2P sent from picture image output device 2P, distance/time calculation means 14 that calculates the distances or times for transmission between the host device main body and the picture image output device based on the position information of picture image output device 2P and the position information of the host device main body 1H that was stored in position information storage means 12, picture information output device 15 that selects one of the multiple picture image output devices (1P, 2P or 3P illustrated in FIG. 2) based on the calculation results, output conditions establishment means 16, output conditions transmission means 17, and output picture image transmission means 18.

Picture image output device 2P of the present embodiment corresponding to host device 1H includes a position information establishment means 21 that establishes the position information of the picture image output device main body, position information storage means 22 that stores this position information, position information transmission means 23 that transmits this position information to host device 1, output conditions receiving means 24 that receives the output conditions that were sent from host device 1, output picture image receiving means 25, picture image output conditions indication means 26, and picture image output means 27.

Host device 1H transmits the picture image information through network N to the picture image output device 2P. Distance/time calculation means 14 calculates the distances or times from host device 1 to each picture image output device based on the position information of the host device main body and the position information of each picture image output device that was previously provided among the multiple picture image output devices 1P, 2P and 3P and the physically and temporally closest picture image output devices are selected by the picture image output device selection means 15.

The present invention allows the picture image information to be output from host device 1H to sheets of paper or other recording medium printed on by a picture image output device (1P, 2P or 3P) such that the user receives the output results in the minimum amount of time possible.

Figure 3:
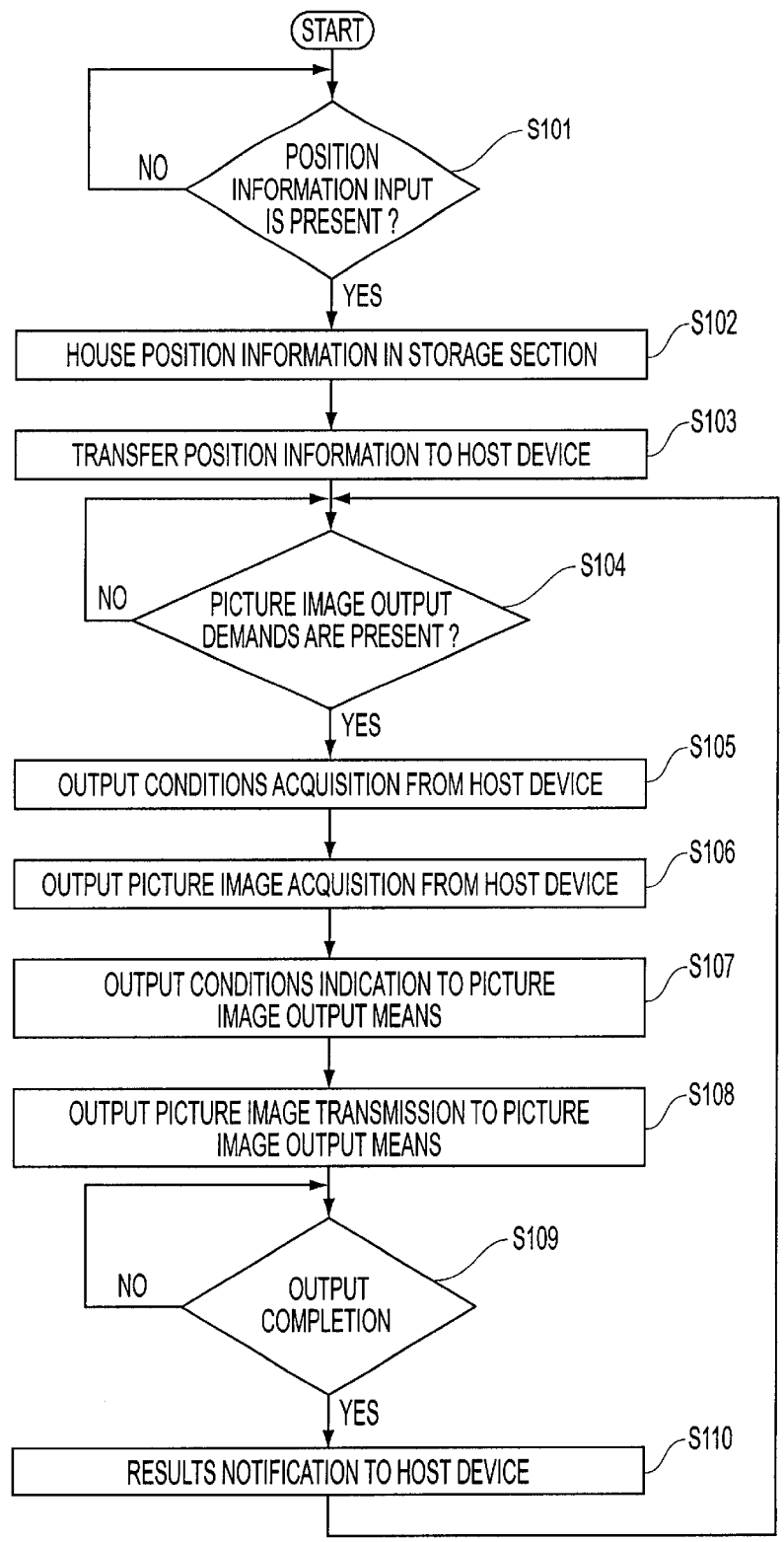
FIG. 3 is a flowchart showing processes performed by the first embodiment.
Figure 4:
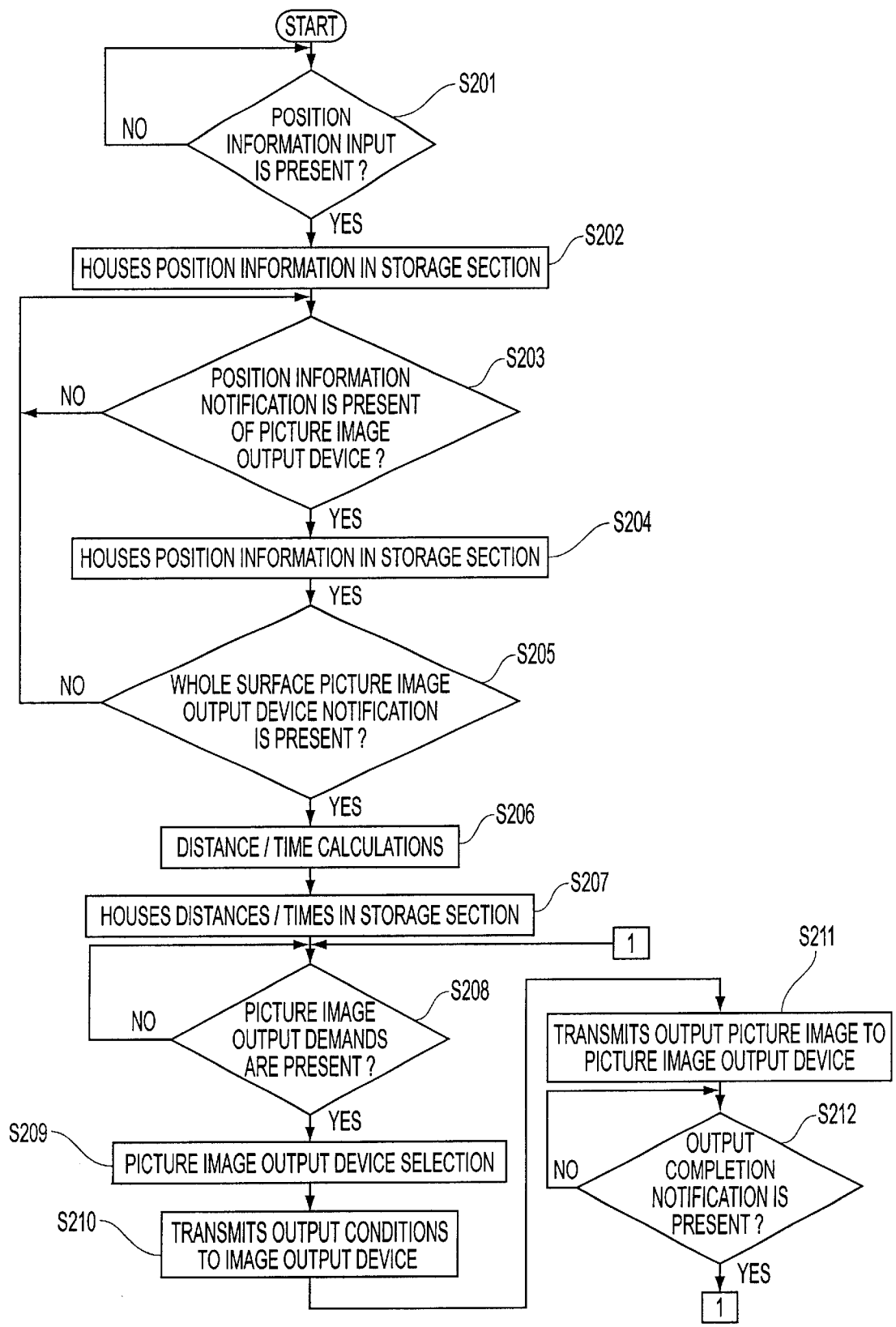
FIG. 4 is a flowchart showing processes performed by the first embodiment.

Next, an explanation is provided of the processing means of the first embodiment along with the operations of the above-described components based on the flowcharts of FIG. 3 and FIG. 4. Reference characters not illustrated in FIG. 3 and FIG. 4 are shown in FIG. 1.

First, an explanation is given of the processing on the side of picture image output device 2P, with reference to FIG. 3. In the beginning, a determination is made as to whether the position information has been input, as shown in Step S101. The position information is input by means of the position information establishment means 21 of picture image output device 2P. When there is input of the position information, processing is performed that stores the position information in the storage or recording section 22, as shown in Step S102.

Next, processing is performed that transmits the position information to host device 1H, as shown in Step S103. The transmission of the position information is performed with position information transmission means 23. Next, a determination is made as to whether there are picture information output demands, as shown in step S104. In the case that there are picture image output demands from host device 1H, the output conditions are acquired from host device 1H, as shown in step S105, and the output picture image is acquired from host device 1H as shown in step S106. Also, an indication is made of the output conditions relative to picture image output means 27 in step S107, and the processing is performed that transmits the output picture image to picture image output means 27 by step S108.

Next, a determination is made as to whether the output of the picture image is completed by step S109, and in the case that it is completed, a notification of these results is sent to host device 1H, as shown in step S110.

Next, an explanation is provided of the processing on the side of host device 1H, with reference to FIG. 4. In the beginning, a determination is made as to whether there is input of the position information, as shown in step S201. Position information is input by means of position information establishment means 11 of host device 1H. In the case that there is input of the position information, processing is performed that stores the position information in the storage section, as shown in step S202. This position information is stored within position information storage means 12.

Next, a determination is made as to whether there is position information notification from the picture image output device, as shown in step S203. In the case that there is notification of the position information, this position information is received by position information receiving means 13 in step S204, and is stored in position information storage means 12.

Next, there is a determination as to whether there is notification from all of the picture image output devices, as shown in step S205. In the case that there are picture image output devices that have not given notification, the program returns to steps S203 and S204. In the case that there is notification from all of the picture image output devices, distance/time calculations are performed as in step S206. These calculations are performed by means of distance/time calculation means 14, and the time or distances between the host device 1H main body and each picture image output device are calculated. Also, the calculation results are stored in the storage section in step S207.

Next, a determination is made as to whether there are picture image output demands, as shown in step S208. In the case that there are output demands, the selection of picture image output devices is performed as shown in step S209. In other words, the picture image output devices are selected by this processing such that the user can attain the information in the shortest possible time from the host device 1H, in accordance with each distance or time that was calculated for each picture image output device.

The output conditions are transmitted to the selected picture image output device at step S210. The output conditions are transmitted from host device 1H to the selected picture image output device by transmission means 17. Next, processing is performed that transmits the output picture image from the host device 1H to the picture image output device as shown in step S211. The output picture image transmission is performed by output picture image transmission means 18.

A determination is made at step S212 as to whether the output of the output picture image is completed from the picture image output device, and in the case that the output is finished, the processing is finished.

When the picture image output demands are performed from a single host device (such as host device 1H) through the network having multiple picture image output devices connected (such as output devices 1P, 2P and 3P) the present invention according to the above-described first embodiment allows the closest picture image output device 2P to be selected by the host device 1H, and the picture image information can be output to output device 2P. Accordingly, the user can obtain the output results in a very short time.

Figure 5:
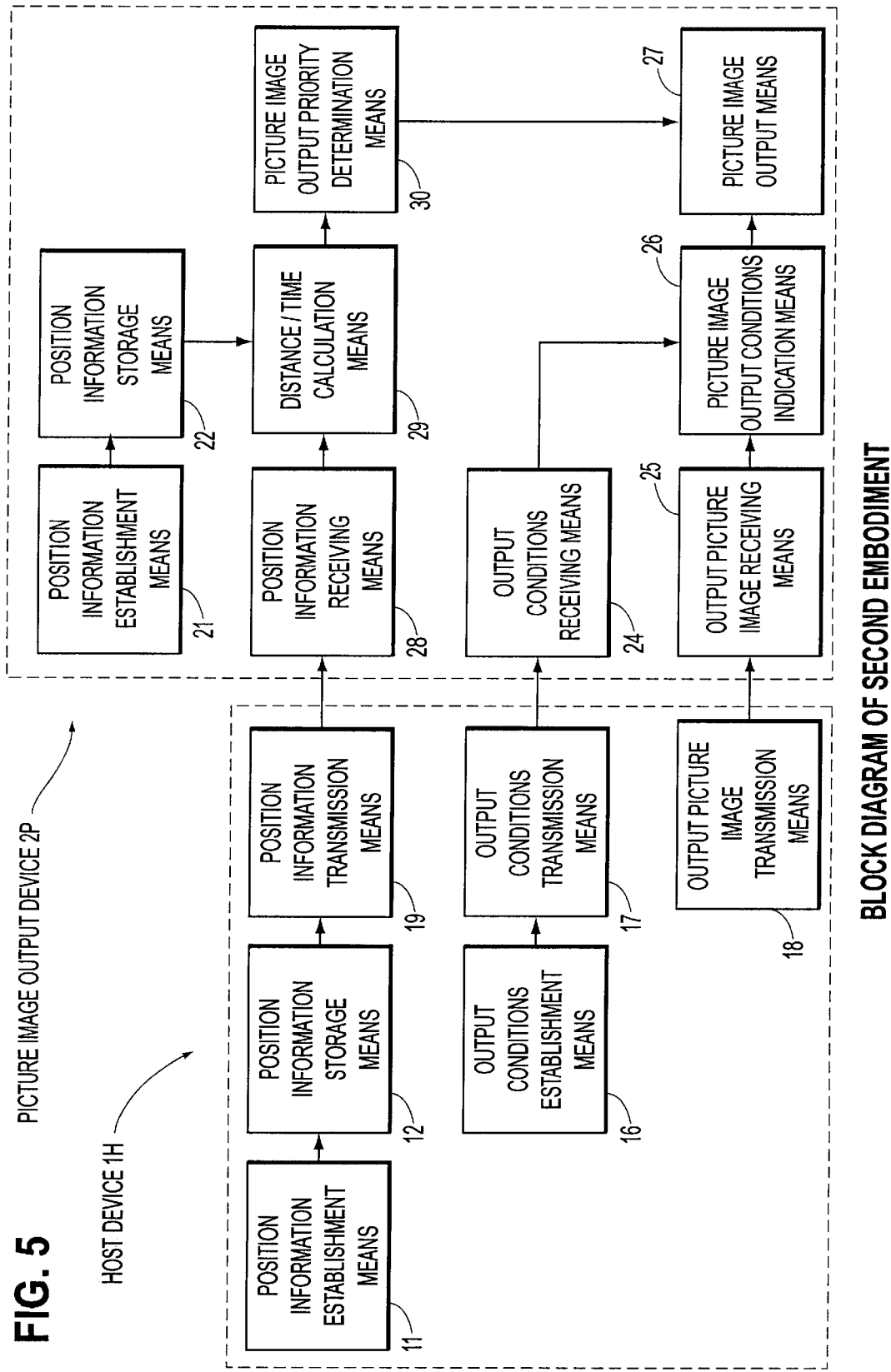
FIG. 5 is a block diagram showing a second embodiment.
Figure 6:
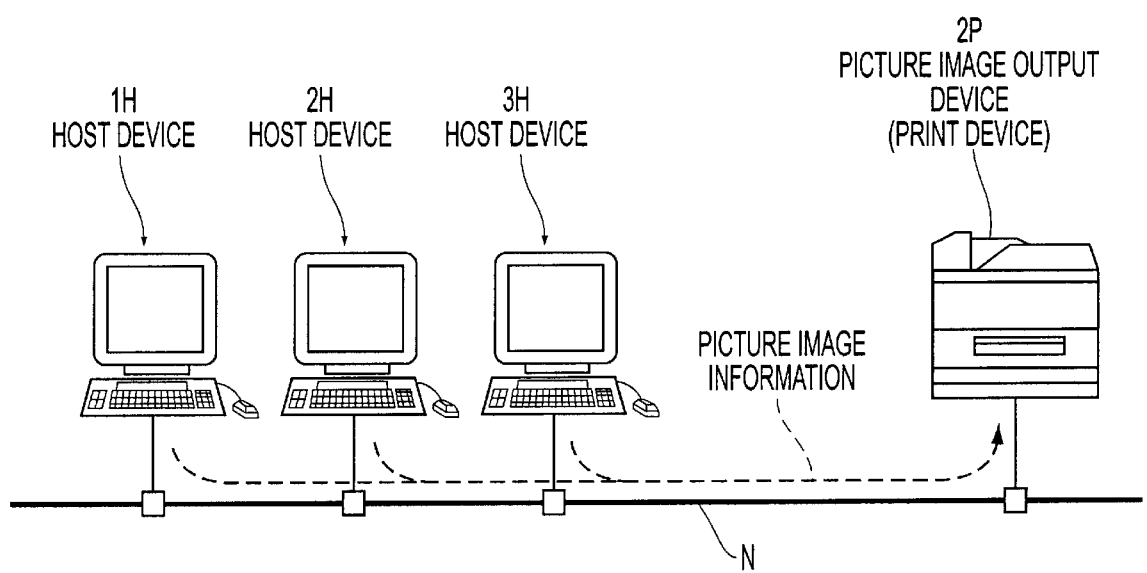
FIG. 6 is a schematic diagram showing the interconnections of the second embodiment.

Next, an explanation is given of a second embodiment of the present invention. FIG. 5 is a block diagram showing components of the second embodiment. FIG. 6 shows the interconnections of the various components in the second embodiment. The picture image output information is transmitted to picture image output device 2P through network N from multiple host devices 1H, 2H and 3H. The second embodiment provides an example where there is prioritizing and processing of the picture image output demands from multiple host devices 1H, 2H and 3H.

As shown in FIG. 5, host device 1H of the second embodiment includes position information establishment means 11 that establishes the position information of the host device main body, position information storage or recording means 12 that stores this position information, position information transmission means 19 that transmits the position information to picture image output device 2P, output conditions establishment means 16, output conditions transmission means 17, and output picture image transmission means 18.

Also, picture image output device 2P of the second embodiment includes position information establishment means 21 that establishes the position information of the picture image output device main body, position information storage or recording means 22 that stores this position information, position information receiving means 28 that receives the position information that was transmitted from host device 1H, distance/time calculation means 29 that calculates the distances or times between the picture image output device and the host device based on the position information of the picture image output device 2P main body and the position information of host device 1H that was stored in position information storage means 12, picture image output priority determination means 30 that determines the priority of outputs from the multiple host devices 1H, 2H and 3H based on the calculation results, output conditions receiving means 24 that receives the output conditions that were transmitted from host device 1H, output picture image receiving means 25, picture image output conditions indication means 26, and picture image output means 27.

According to the second embodiment, when the picture image information is sent from the multiple host devices 1H, 2H and 3H through network N to a picture image output device 2P, distance/time calculation means 29 calculates the distances or times from this picture image output device 2P back to each host device 1H, 2H and 3H based on the position information of the picture image output device 2P main body and the position information of each host device 1H, 2H and 3H that were provided beforehand. Processing is performed that prioritizes the physically or temporally closest host device with the picture image output priority determination means 30.

Therefore, in the case that there are output demands from multiple host devices 1H, 2H and 3H, to print on a sheet of paper or other recording medium at a picture image output device 2P, the picture image output demands are prioritized from the host devices 1H, 2H and 3H such that the user can minimize the amount of time required to obtain the output at output device 2P.

Figure 7:
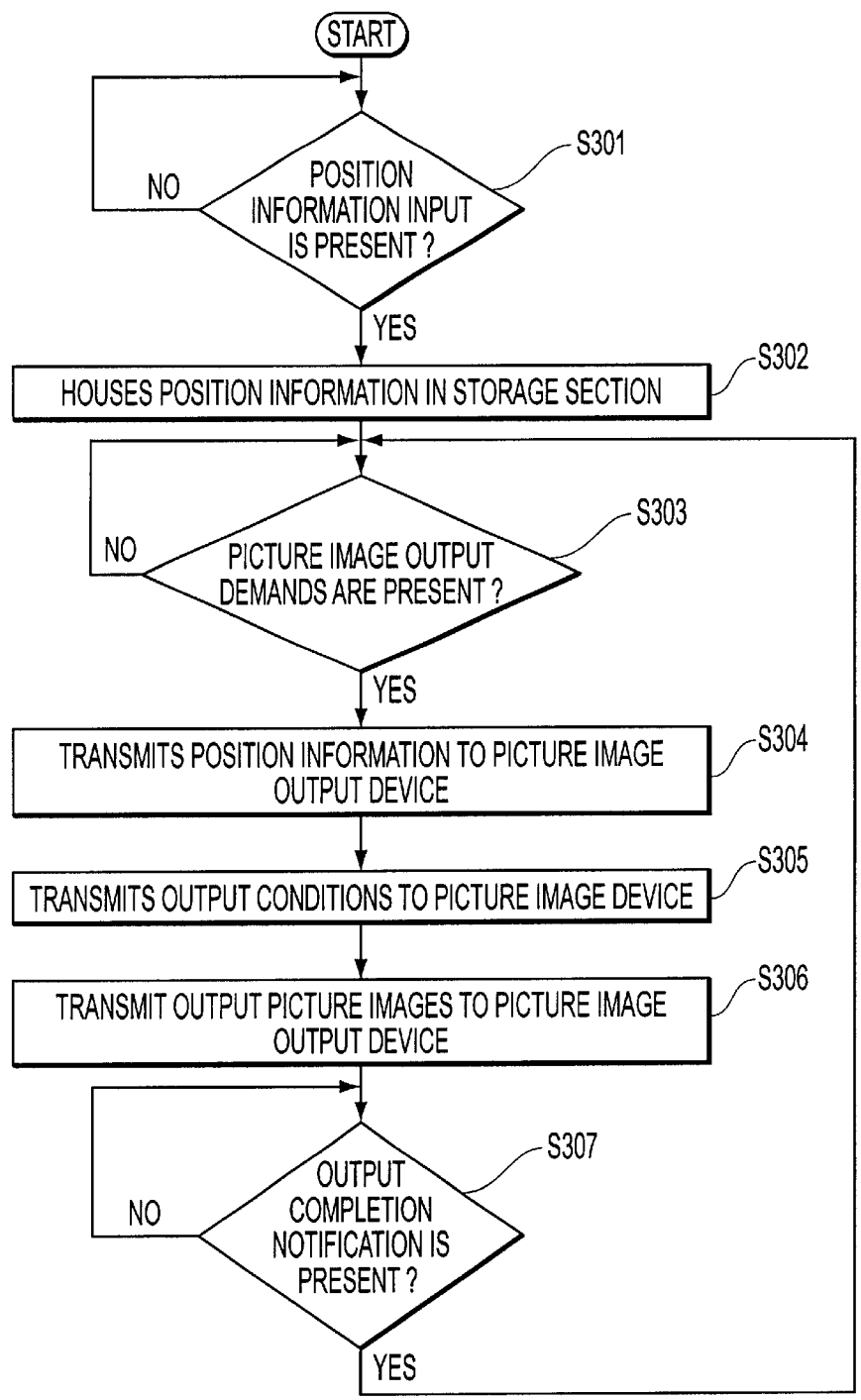
FIG. 7 is a flowchart showing the processes performed by the second embodiment.
Figure 8:
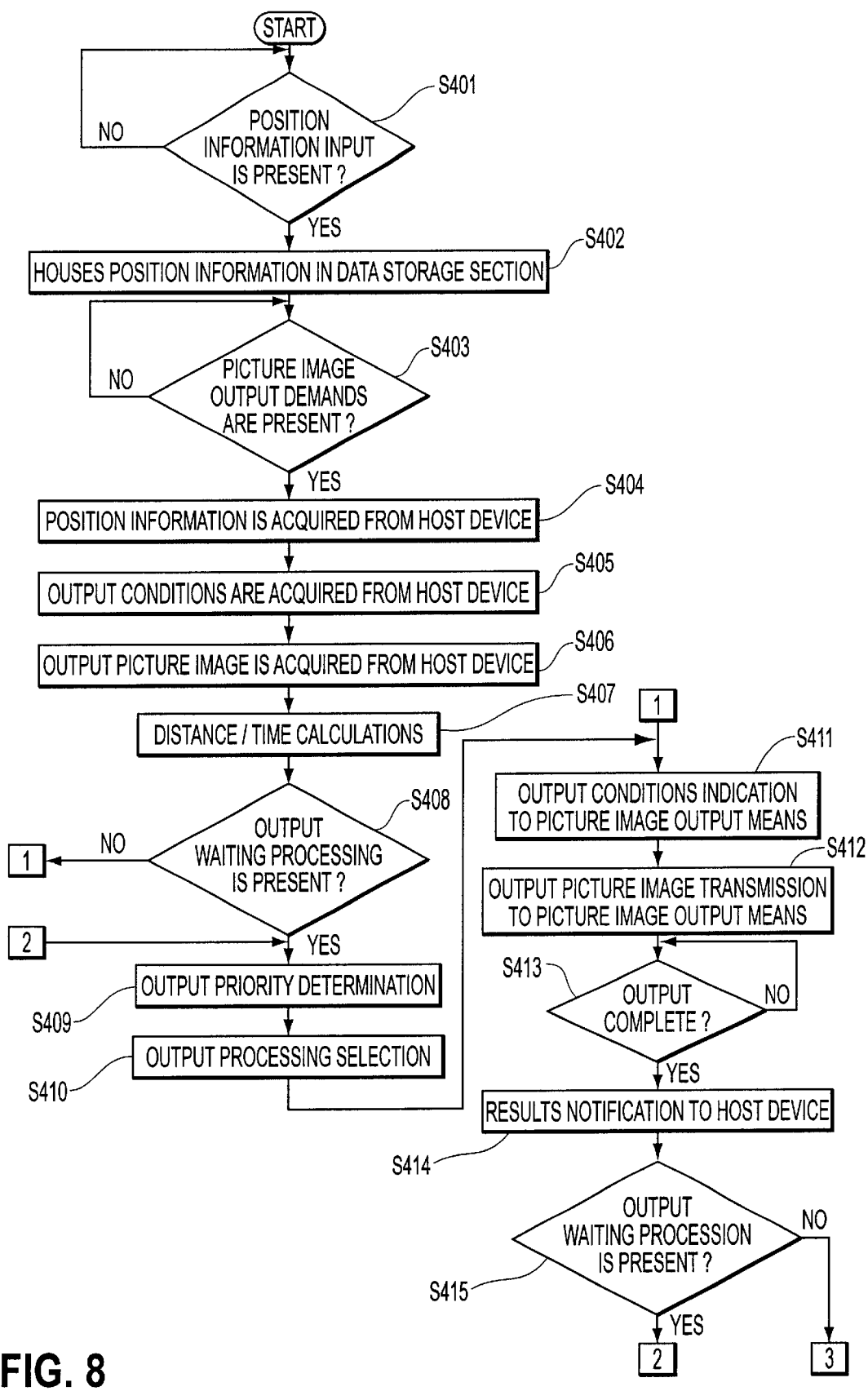
FIG. 8 is a flowchart showing the processes performed by the second embodiment.

Next, an explanation is provided of the processing performed by the various components in the second embodiment, with reference to the flowcharts of FIG. 7 and FIG. 8. Furthermore, the reference characters not illustrated in FIG. 7 or FIG. 8 are shown in FIG. 5.

First, an explanation is provided of the processing from the side of host device 1H, with reference to FIG. 7. In the beginning, a determination is made as to whether there is input of position information, as shown in step S301. The position information is input by means of position information establishment means 11 of host device 1H. In the case that there is input of position information, processing is performed that stores the position information in the storage or recording section 12, as shown in step S302.

Next, a determination is made as to whether there are picture image output demands, as shown in step S303. In the case that there are picture image output demands from host device 1H, the processing is performed that transmits the position information to picture image output device 2P, as shown in step S304. Position information transmission means 19 performs this transmission of position information. The output conditions are acquired from host device 1H, and the output picture images are acquired from host device 1H in step S306. Also, in step S305, processing is performed that transmits output conditions from the output conditions transmission means 17 to picture image output device 2P, and processing is performed that transmits the output picture images to the picture image output device 2P by means of step S306.

Subsequently, host device 1H makes a determination as to whether there is output completion notification from picture image output device 2P, as shown in step S307. The program returns to step S303 in the case that there is notification.

Next, an explanation is provided of the processing on the side of picture image output device 2P, with reference to FIG. 8. In the beginning, a determination is made as to whether there is input of the position information, as shown in step S401. Position information is input by means of position information establishment means 21 of picture image output device 2P. In the case that there is input of the position information, processing is performed that houses the position information and stores it in the storage section as shown in step S402. This position information is stored within position information storage means 22.

Next, a determination is made as to whether there are picture image output demands from host device 1H, as shown in step S403. In the case that there are output demands, the position information is acquired from this host device 1H, as shown in step S404, and the acquisition of the output conditions is performed as shown in step S405.

Next, the output picture image is acquired from host device 1H in Step S406. In the following step S407, calculations are performed of the distances or times between the host device and the picture image output device based on the position information obtained from host device 1H and the position information of the picture image output device 2P main body that is stored in position information storage means 22.

Next, a determination is made as to whether there is output waiting to be printed at step S408. In the case that there is no output waiting, the processing moves to step S411 and thereafter. In other words, in the case that there is no output waiting, there is an indication of output conditions sent to picture image output means 27 in step S411, and processing is performed that transmits the output picture image information to picture image output means 27 in step S412.

A determination is made as to whether the picture image output is completed by Step S413. In the case that picture image output is completed, the processing is performed that sends the notification of these results to host device 1H in step S414.

In the case that there is output waiting processing in step S408, the program proceeds to Step S409, and an output priority determination is performed. The physically or temporally closest host device 1H to picture image output device 2P is selected from among multiple host devices 1H, 2H and 3H, based on the distances/times that were previously calculated. The highest priority picture image output demands are then selected. The output processing is selected based upon the results of the output priority determination and sent to the selected host device I at step S410. Subsequently, the output processing of picture image information that was acquired from the host device 1H, or in other words the processing of steps 411–414 in FIG. 8 is performed.

After the results of a determination whether output is complete is sent to host device 1H in step S414, the program proceeds to step S415, and a determination is made anew as to whether there is output awaiting processing. In the case that there is not output awaiting processing, the program returns to step S403, and waits for the picture image output demands. In the case that output awaiting processing remains, the program proceeds to step S409, and the output priority determination is made from among host devices 1H, 2H and 3H with regard to the remaining picture image output demands, and the processing of steps S410–S414 are performed.

In the case that picture image information is transmitted from multiple host devices 1H, 2H and 3H through network N by means of the processing of host devices and picture image output devices according to the present invention, prioritizing can be performed with the physically or temporally closest host device receiving the highest priority. Picture image output processing is performed following this prioritizing. Accordingly, picture image output is performed in the order from the host device that is physically or temporally closest to a picture image output device. Therefore, each user of each host device can retrieve the output results in the most efficient manner.

Figure 9:
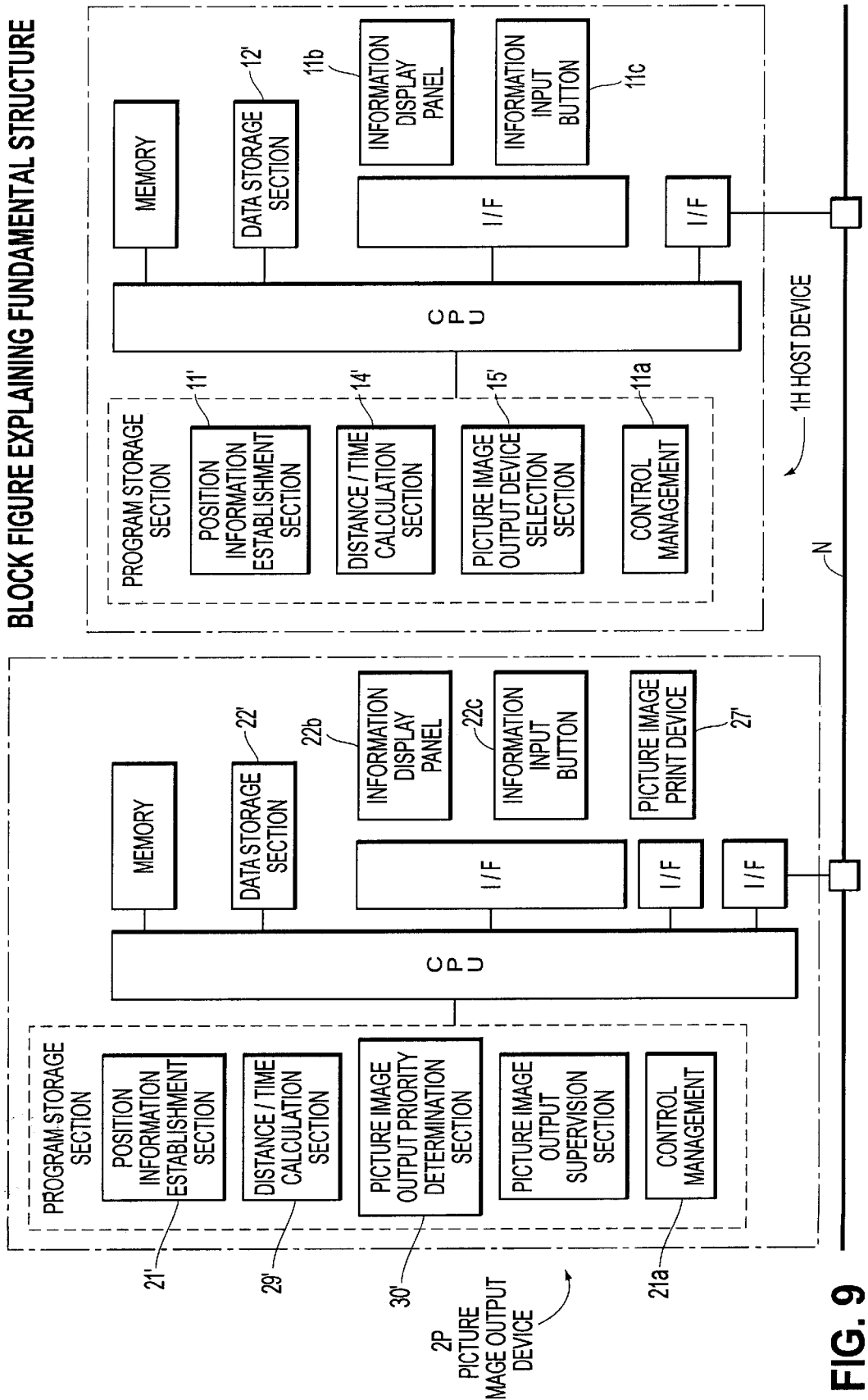
FIG. 9 is a block diagram showing the fundamental structure of the present invention.

FIG. 9 is a block diagram that shows a fundamental structure of the present invention enabling the processing according to both the first embodiment and the second embodiment explained above. In the program storage section of host device 1H', programs or subroutines are stored in a position information establishment section 11' corresponding to position information establishment means 11 (shown in FIG. 1), distance/time calculation section 14' corresponding to distance/time calculation means 14 (shown in FIG. 1), and picture image output device selection section 15' corresponding to picture image output device selection means 15 (shown in FIG. 1).

Also, data storage section 12' that connects to the CPU corresponds to position information storage means 12 (shown in FIG. 1). In the case where the position information is input in host device 1H', control management section 11a starts by means of the program processing of position information establishment section 11', and the display content of the information display panel 11b is referenced, and the prescribed position information is input by means of information input button 11c. This position information is stored within data storage section 12', and when there are picture image output demands, they are transmitted through network N to picture image output device 2P'.

Also, in the program storage section of picture image output device 2P', position information establishment section 21' that corresponds to position information establishment means 21 (refer to FIG. 1), distance/time calculation section 21' that corresponds to distance/time calculation means 29 (refer to FIG. 1), and picture image output priority determination section 30' that corresponds to picture image output priority determination means 30 (refer to FIG. 1) are stored as programs.

Also, data storage section 22' that connects to the CPU corresponds with position information storage means 22 (refer to FIG. 1). In the case that the position information is input in picture image output device 2P', control management section 21a starts by means of the program processing of position information establishment section 21' and the display content of information display panel 22b, and the prescribed position information is input by means of information input button 22c. This position information is included within data storage section 22', and when the position information is changed, it is transmitted to the host device 1H' through network N during the time that the power source outputs.

Figure 10:
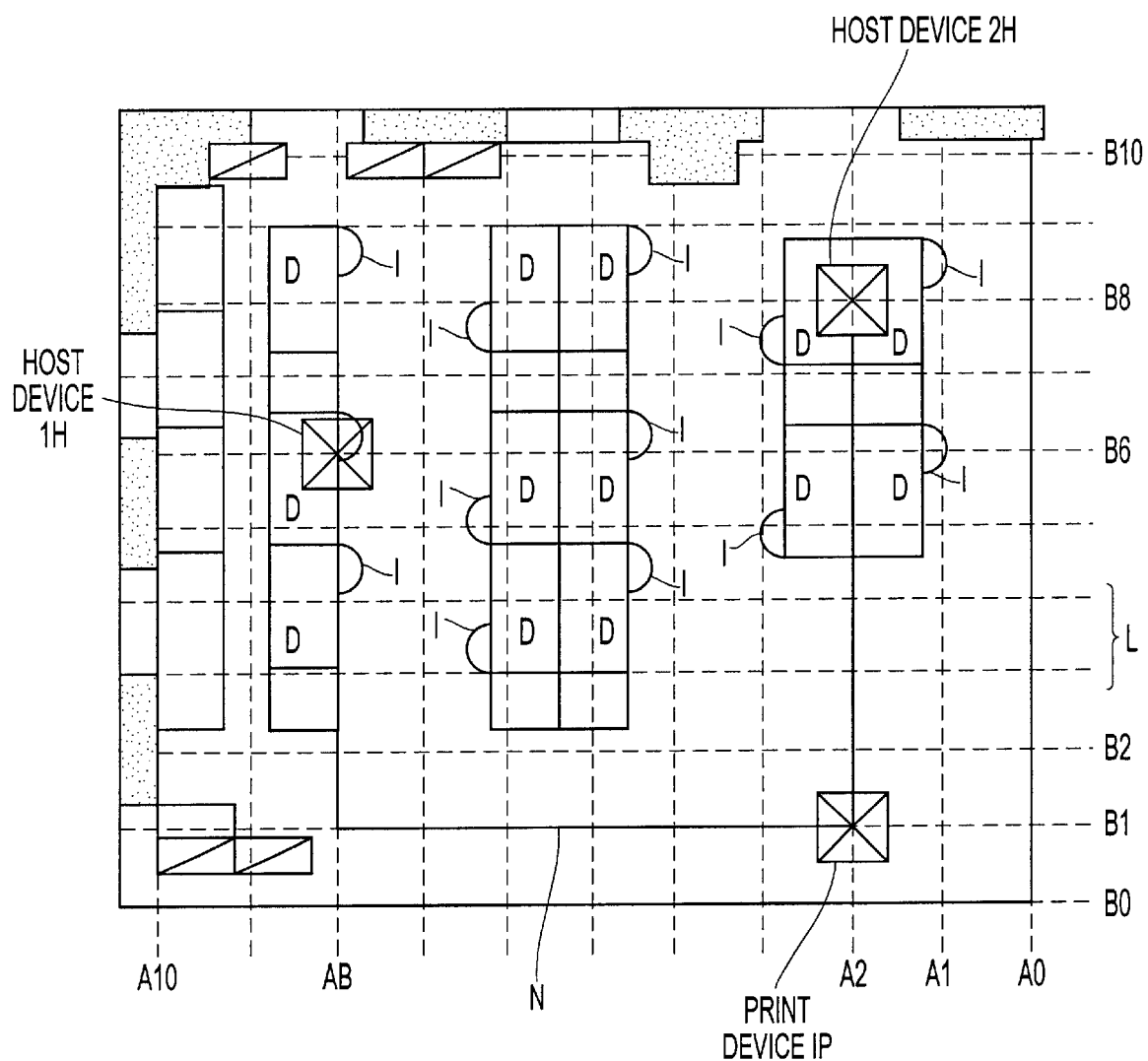
FIG. 10 is a schematic drawing showing a possible layout of components in the present invention.

FIG. 10 is a schematic diagram illustrating an example of a layout for the present invention. The reference character D represents a desk, and the reference character I represents a chair. The layout of this office is shown superimposed over a coordinate system that includes an axis in the horizontal direction (A axis) and an axis in the vertical direction (B axis). The distance between each line on the grid is shown for example to be 1 meter.

In the office shown with this kind of coordinate system, host devices 1H and 2H are shown for example to be arranged at the positions of (A8, B6) and (A2, B8). The print device 1P is arranged for example at the position of (A2, B1).

In this case, the user inputs the arrangement positions of each host device displayed by the AB coordinate system with information input button 11c of each host device (refer to FIG. 9) as the respective position information. Also, the arrangement positions of each image output device that are displayed by the AB coordinate system are input as position information with information input button 22c (refer to FIG. 9).

The input coordinates are stored in data storage section 12' (refer to FIG. 9) of each host device as well as in data storage section 22' (refer to FIG. 9) of the print device. The position information of the print devices is transmitted to each host device through network N at the time that there is power supply output of the print device and notification of the print device arrangement positions and the like. Also, the position information of each host device is transmitted to the print devices through network N when the picture image output demands are sent out from each host device.

Calculations are performed to determine the distances or times between each host device and print device by distance/time calculation section 29' (refer to FIG. 9) of the print device below. The length of wire (represented by N in FIG. 10) connecting the print device to the host device is:

{(A coordinate value of host device−A coordinate value of the print device)+(B coordinate value of host device−B coordinate value of the print device)}×1 meter.

Also, in the case where the transmission speed to the user is for example 3 km/h, the transmission time in seconds is calculated by means of the following equation:

(distance of the wire or network connecting the print device and host device)/(3000/3600).

Therefore, for the layout example illustrated in FIG. 10, the distance between the print device 1P and host device 1H={(8−2)+(6−1)}×1=11 m.

The distance between the print device 1P and host device 2H={(2−2)+(8−1)}×1=7 m. The transmission time between the print device 1P and host device 1H=11/(3000/3600) =13.2 (seconds) and the transmission time between the print device 1P and host device 2H=7/(3000/3600)=8.4 seconds.

These calculation results are stored in data storage sections 12' and 22' (refer to FIG. 9), and are used in the selection of the picture image output device and the determination of picture image output priority and the like. For example, with the office layout of FIG. 10, when the picture image output demands are sent from both host device 1H and host device 2H, the processing based on the results that were calculated above by the print device prioritizes the picture image output demands from host device 2H, which is both physically and temporally closest to the print device 1P.

Furthermore, although the above example shows position information being input to host device 1H and picture image output device 1P, this position information does not have to be input if the transmission time between the host device and the picture image output device is directly input.

Although the distance between a host device and a picture image output device is calculated above for a relatively simple configuration along the AB coordinate axes, the transmission time could be calculated by other more complex equations if required. For example, there may be cases where the speed of transmission resulting from a particular layout of the office is not a constant velocity, and special equations taking this into consideration can be used. Additionally, in the case where the path followed by the wiring or network N is more complex, the calculated values take this into consideration.

Furthermore, the example was shown where the position information is input using position determination means 11 and 21 of host device 1H and picture image output device 2P. However, the present invention is not limited to such a configuration, and it is possible to install position detection sensors on the host devices and picture image output devices such that position information is automatically obtained by means of the position detection sensors.

As explained above, the present invention provides a means for more efficient utilization of time and printing resources with a system having one or more host devices and picture image output devices. Information based on the positional relationships of the host devices and picture image output devices is stored in a storage means, and a determination is made of which of the multiple picture image output devices are selected by means of this information. A determination can also be made of which of a plurality of host devices receiving picture image output demands should be given highest priority in transmission to a picture image output device. Accordingly, it becomes possible to maximize the efficiency of responding to user output demands.

What is claimed is:

1. A print device for receiving picture image information from one of a plurality of host devices that are arranged in prescribed positions throughout a network, comprising:
   a main body;
   means for storing information based on physical or temporal positional relationships between said main body and the plurality of host devices; and
   means for preferentially printing a picture image information from one of a plurality of host devices selected in accordance with the information based on smallest physical or temporal positional relationship stored in said storing means.

2. The picture image output device of claim 1, wherein the information based on said physical or temporal positional relationships comprises coordinates designating relative positions of said main body and said plurality of host devices.

3. The picture image output device of claim 1, wherein the information based on said physical or temporal positional relationships comprises times for transmission of said picture image information from said main body to said plurality of host devices.

4. The picture image output device of claim 1, further including:
   means for calculating the physical distance a signal must travel between said main body and said plurality of host devices or the time required for such a signal to travel between said main body and said plurality of host devices, with said means for storing information storing said physical distance or said time as calculated by said means for calculating.

5. The picture image output device of claim 1, further including:
   means for receiving information based on physical or temporal positional relationships from respective ones of said plurality of host devices.

* * * * *